United States Patent
Shimoyama

(10) Patent No.: US 9,243,980 B2
(45) Date of Patent: Jan. 26, 2016

(54) BUSH COMPONENT FORCE DETECTION DEVICE

(71) Applicant: Fuji Jukogyo Kabushiki Kaisha, Tokyo (JP)

(72) Inventor: Hiroshi Shimoyama, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 85 days.

(21) Appl. No.: 14/265,171

(22) Filed: Apr. 29, 2014

(65) Prior Publication Data

US 2014/0331756 A1  Nov. 13, 2014

(30) Foreign Application Priority Data

May 8, 2013  (JP) .................. 2013-098596

(51) Int. Cl.
*G01M 17/04* (2006.01)
*G01L 5/00* (2006.01)

(52) U.S. Cl.
CPC ............. *G01M 17/04* (2013.01); *G01L 5/0057* (2013.01)

(58) Field of Classification Search
CPC ..... G01L 5/0004; G01L 3/108; G01L 5/0057; G01L 5/0009; G01M 17/04
USPC .......... 73/117.03, 862.338, 862.044, 862.045
See application file for complete search history.

(56) References Cited

U.S. PATENT DOCUMENTS

| | | | | |
|---|---|---|---|---|
| 3,481,192 A * | 12/1969 | Herzog | ...................... | G01L 3/10 73/514.02 |
| 4,474,060 A * | 10/1984 | Crossman | .................. | B60T 8/52 188/181 T |
| 4,487,078 A * | 12/1984 | Schmitz | ..................... | G01L 5/24 73/862.045 |
| 4,577,513 A * | 3/1986 | Harwood | ............... | G01L 3/1457 414/730 |
| 6,273,613 B1 * | 8/2001 | O'Brien | ................. | F16C 11/045 384/448 |
| 6,766,685 B2 * | 7/2004 | Foley | ..................... | G01L 1/2225 73/121 |
| 7,188,535 B1 * | 3/2007 | Spletzer | .................. | G01L 5/161 177/211 |
| 7,677,117 B2 * | 3/2010 | Perriard | ..................... | B60T 8/52 73/779 |
| 7,683,274 B2 * | 3/2010 | Dellac | ................... | G01L 5/0004 177/211 |
| 7,770,461 B2 | 8/2010 | Perriard et al. | | |
| 8,649,906 B2 * | 2/2014 | Bischoff | ................ | B25J 13/085 700/258 |
| 9,016,134 B2 * | 4/2015 | Freshour | ............... | G01L 5/0004 73/774 |
| 2006/0266561 A1 * | 11/2006 | Dellac | ................... | G01L 5/0004 177/136 |
| 2014/0331755 A1 * | 11/2014 | Shimoyama | .......... | G01L 5/0009 73/117.03 |
| 2014/0331757 A1 * | 11/2014 | Shimoyama | .......... | G01L 5/0057 73/117.03 |
| 2014/0331789 A1 * | 11/2014 | Shimoyama | ............ | G01L 3/108 73/862.338 |

FOREIGN PATENT DOCUMENTS

| | | |
|---|---|---|
| JP | 2004-270832 A | 9/2004 |
| JP | 2005-147291 A | 6/2005 |
| JP | 2011-085514 A | 4/2011 |
| JP | 2012-127764 A | 7/2012 |
| JP | 5140853 B2 | 2/2013 |

OTHER PUBLICATIONS

Decision to Grant dated May 19, 2015.
First Notification of Refusal dated Mar. 10, 2015.

* cited by examiner

*Primary Examiner* — Freddie Kirkland, III
(74) *Attorney, Agent, or Firm* — McGinn IP Law Group, PLLC

(57) ABSTRACT

A bush component force detection device detects a component force acting on a bush which is press-fitted into a hole provided in a frame of a vehicle. The bush component force detection device includes: a cylinder which is inserted into the hole with predetermined space therefrom and has strain gauges; elastically deformable outer-side projections that extend in an axial direction of the cylinder and project radially outward from an outer surface of the cylinder; and elastically deformable inner-side projections that extend in an axial direction of the cylinder and project radially inward from an inner surface of the cylinder.

4 Claims, 6 Drawing Sheets

BUSH COMPONENT FORCE DETECTION DEVICE

CROSS-REFERENCE TO RELATED APPLICATIONS

The present application claims priority from Japanese Patent Application No. 2013-098596 filed on May 8, 2013, the entire contents of which are hereby incorporated by reference.

BACKGROUND

1. Technical Field

The present invention relates to a bush component force detection device that detects a component force acting on a bush which is provided in a connecting portion of a structural member of a vehicle.

2. Related Art

The suspension of a vehicle has an effect on riding comfort and driving stability of the vehicle, and so component forces of the suspension are measured to evaluate the riding comfort and driving stability of the vehicle. A vehicle is designed based on the evaluation of the riding comfort and driving stability of the vehicle. Therefore, the riding comfort and driving stability of a vehicle can be improved by accurately measuring dynamic change in each component force in portions of the suspension.

Various methods have been proposed to detect changes in component forces such as yaw, pitch, and roll which act on the portions of the suspension mechanism. For example, Japanese Unexamined Patent Application Publication No. 2011-85514 discloses a load measurement sensor which includes a plurality of strain gauges and is tightly fixed to a rod-like body such as a damper in the suspension mechanism of a vehicle.

Here, shafts, which serve as connecting portions between the frame of the vehicle and an arm member, are base points for allowing the arm member to be moved, and thus for the design and adjustment of the suspension mechanism, it is necessary to detect component forces in the connecting portions between the frame and the arm member with high accuracy.

However, even if a sensor is mounted on a damper, an arm member or the like as described above for measuring the behavior of each of the portions of the suspension, the behavior of each shaft (movable connecting portion of each member) may not be measured accurately. That is, in order to measure the behavior of each shaft of the suspension, calculation is performed based on a result of measurement made by a sensor which is mounted on an arm or a damper connected to the shaft to be measured, and thus the calculation gives only a predicted value. Particularly, when an elastic body is used for a bearing of the suspension, the distribution of the force acting on the bush varies depending on the position and the quality of material of the mounting member of the bush, and thus it is difficult to measure the distribution of the force acting on the bush accurately by the method of calculation as mentioned above.

SUMMARY OF THE INVENTION

The present invention has been designed in consideration of the circumstances described above, and an object thereof is to provide a bush component force detection device capable of detecting the distribution of component force in each bearing in a suspension mechanism of a vehicle with high accuracy.

A first aspect of the present invention provides a bush component force detection device that detects a component force acting on a bush which is press-fitted into a hole provided in a frame of a vehicle. The bush component force detection device includes: a cylinder which is inserted into the hole with predetermined space therefrom and has strain gauges; elastically deformable outer-side projections that extend in an axial direction of the cylinder and project radially outward from an outer surface of the cylinder; and elastically deformable inner-side projection that extend in an axial direction of the cylinder and project radially inward from an inner surface of the cylinder.

Each of the outer-side projections may be disposed at an interval from adjacent outer-side projections in a circumferential direction of the cylinder, and each of the inner-side projections may be disposed at an interval from adjacent inner-side projections in the circumferential direction of the cylinder.

The outer-side projections and the inner-side projections are alternately disposed in the circumferential direction of the cylinder.

DETAILED DESCRIPTION

FIGS. 1 to 9 illustrate an implementation of the present invention.

Figure 1:
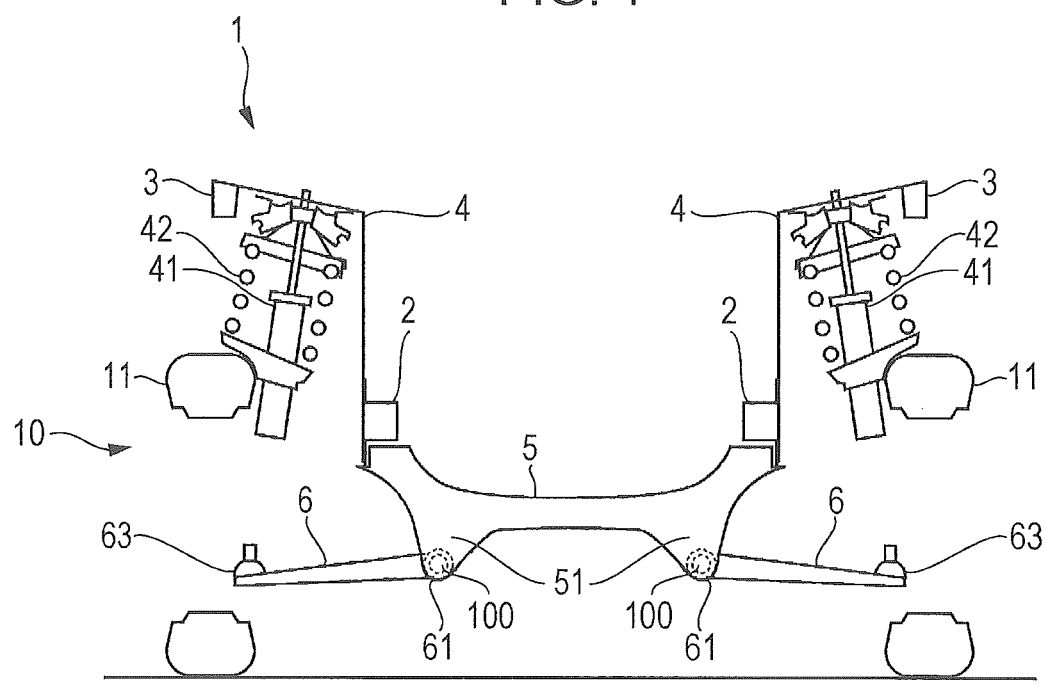
FIG. 1 is a schematic front view of a suspension device of a vehicle according to an implementation of the present invention.
Figure 2:
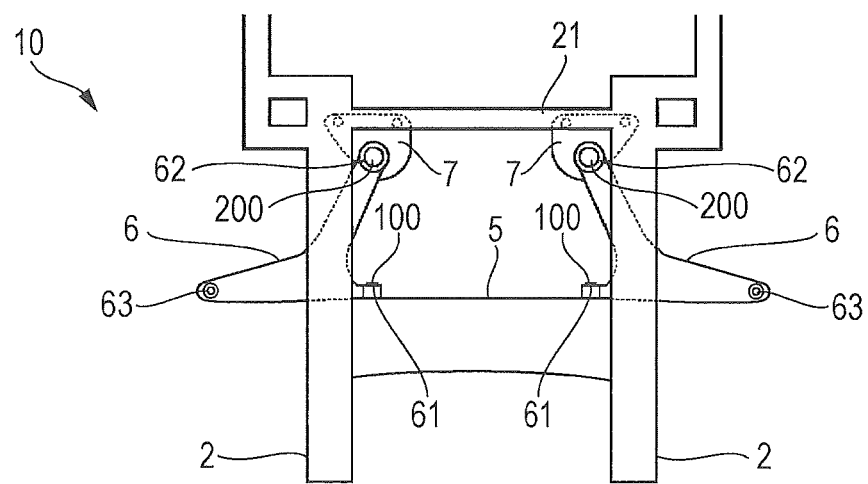
FIG. 2 is a schematic plan view from above of the suspension device of FIG. 1.

As illustrated in FIGS. 1 and 2, a vehicle body 1 of a vehicle equipped with a bush component force detection device of the implementation includes side members 2, upper members 3, strut towers 4, a cross member 5, and a suspension device 10.

Each of the side members 2 is a structural member that extends from a toe board (not illustrated) in a fore-and-aft direction of the vehicle, the toe board serving as a partition wall at the front of the cabin. The side members 2 are provided as a pair on the right and left sides of the engine compartment of the vehicle. The rear ends of the side members 2 on the right and left are connected to each other by a connecting member 21.

The upper members 3 are provided over the right and left side members 2, respectively in a direction outwardly of the vehicle. Each of the upper members 3 is a structural member that extends from the partition wall at the front of the cabin along the right and left edges of an engine hood in a fore-and-aft direction of the vehicle.

The strut towers 4 are provided between the outer ends of the side members 2 in a vehicle width direction and the inner ends of the upper members 3 in a vehicle width direction. The upper ends of the shock absorbers 41 described below are fixed to the strut towers 4.

The cross member 5 is a structural member that extends in a vehicle width direction and the both ends thereof are secured to the lower surfaces of the right and left side members 2 using a bolt or the like. Under the cross member 5, brackets 51 project downward which are connected to the respective lower arms 6 described below.

The suspension device 10 includes shock absorbers 41, lower arms 6, and support plates 7.

The shock absorbers 41 are each a hydraulic shock absorber that has a coil spring 42 on the outer circumferential surface. The upper end of each shock absorbers 41 is rotatably mounted on corresponding one of the strut towers 4 and the lower end thereof is secured and fixed to the upper end of a front wheel suspension member (not illustrated) which rotatably supports a front wheel 11.

The lower arms 6 are suspension arms that are provided as a pair on the right and left sides in a vehicle width direction to support the lower ends of front wheel suspension members. Front bush mounts 61 are provided at the front side in the vehicular fore-and-aft direction of the inner ends of the right and left lower arms 6 in a vehicle width direction. Rear bush mounts 62 are provided at the rear side in the vehicular fore-and-aft direction of the inner ends of the right and left lower arms 6 in a vehicle width direction. Ball joints 63 are provided at the outer ends of the vehicle in a vehicle width direction.

Figure 3A:
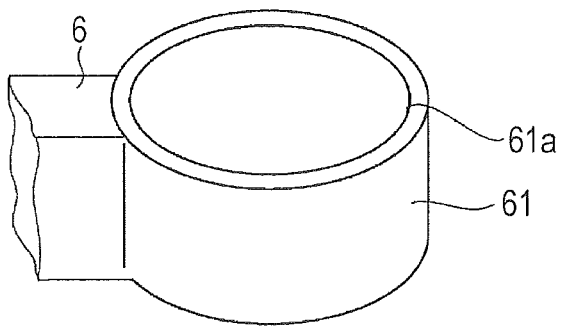
FIGS. 3A to 3D are perspective views of a mount of a front bush, the front bush, a sensing unit, and the end of a lower arm, respectively, of the present invention.

As illustrated in FIG. 3A, each of the front bush mounts 61 is provided at the end of a corresponding lower arm 6, and a cylindrically shaped hole 61a having a central axis extending along the rocking central axis of the lower arm 6 is formed in the front bush mount 61. A front bush 100, which is press-fitted into the below-described sensing unit 150, is press-fitted into the hole 61a.

Figure 3B:
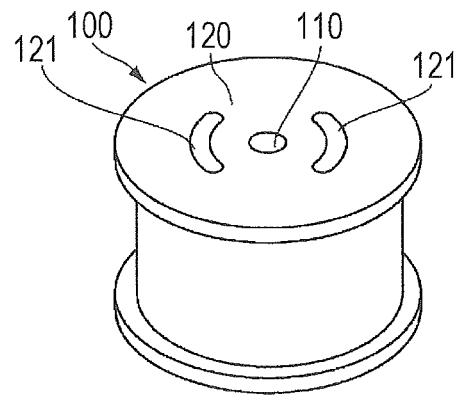

As illustrated in FIG. 3B, the front bush 100 is a cylindrically-shaped rubber bush for vibration isolation, and includes an inner cylinder 110, and a rubber 120. In the rubber 120, bores 121 are formed as a pair on the right and left. The bores 121 are openings through in the axial direction of the inner cylinder 110. Each of the bores 121 is formed in an arc-shape in a plan view centered about the inner cylinder 110, and has different coefficients of elasticity in a radial direction (the x-axis direction) of the rubber 120 and in another radial direction (the y-axis direction) perpendicular to the x-axis.

Figure 3C:
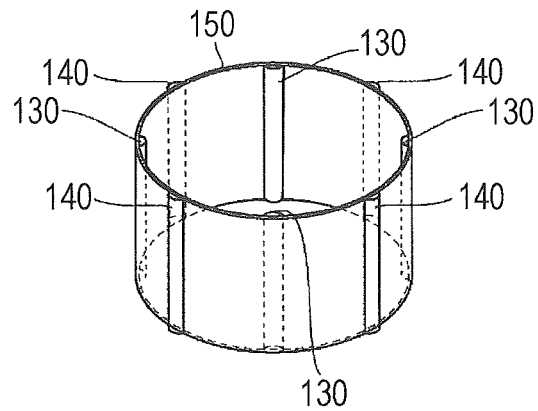

The sensing unit 150 is included in the below-described front bush component force detection device 160, and is formed in a cylindrical shape as illustrated in FIG. 3C. A plurality of inner-side projections 130 is provided on the inner circumferential surface of the sensing unit 150, and a plurality of outer-side projections 140 is provided on the outer circumferential surface thereof. The inner-side projections 130 are elastic members that are formed along the axial direction of the sensing unit 150 and project radially inward from the inner circumferential surface of the sensing unit 150. The outer-side projections 140 are elastic members that are formed along the axial direction of the sensing unit 150 and project radially outward from the outer circumferential surface of the sensing unit 150. The inner-side projections 130 and the outer-side projections 140 are alternately disposed at regular intervals in the circumferential direction of the sensing unit 150. In the present implementation, the number of provided inner-side projections 130 and outer-side projections 140 are four each.

Figure 3D:
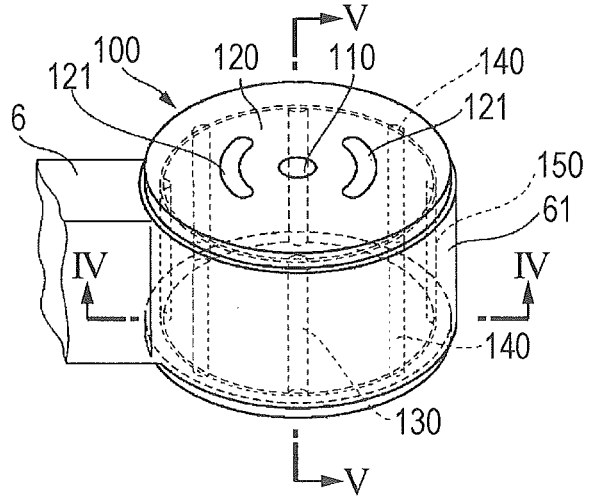
Figure 4:
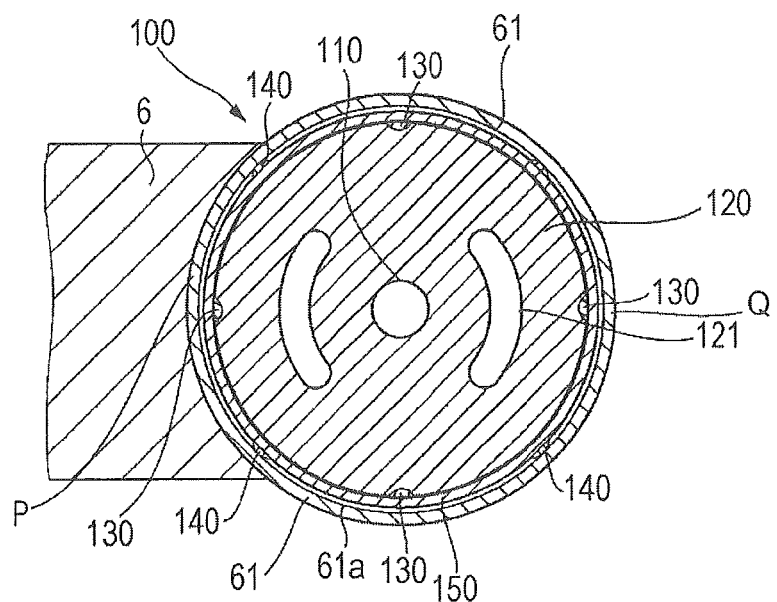
FIG. 4 is a cross-sectional view taken along IV-IV of FIG. 3D.
Figure 5:
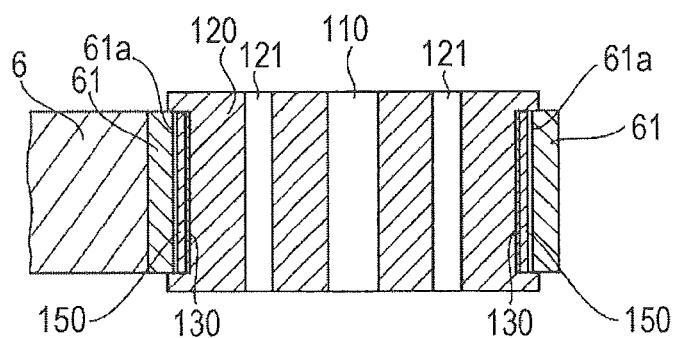
FIG. 5 is a cross-sectional view taken along V-V of FIG. 3D.
Figure 6:
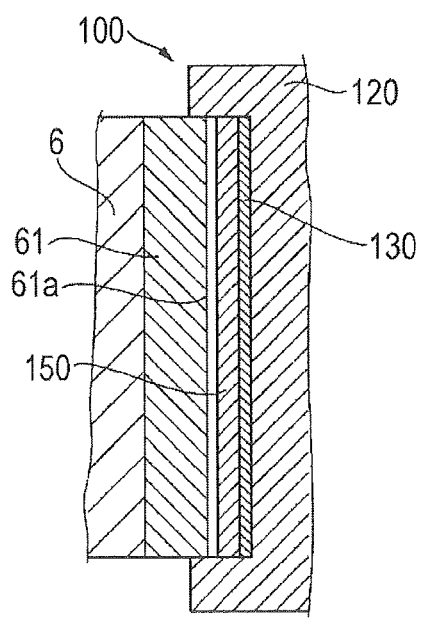
FIG. 6 is an enlarged schematic cross-sectional view of part of FIG. 5.

As illustrated in FIG. 3D, the front bush 100 is press-fitted into the sensing unit 150, and the sensing unit 150, into which the front bush 100 is press-fitted, is press-fitted into the hole 61a. That is, the front bush 100 is installed such that the sensing unit 150 is disposed so as to be interposed between the outer circumferential surface of the front bush 100 and the inner circumferential surface of the hole 61a as illustrated in FIGS. 4 to 6. The front bush 100 is retained on the inner circumferential surface of the sensing unit 150 by radially outward pressure from the front bush 100, and the sensing unit 150, into which the front bush 100 is press-fitted, is retained on the inner circumferential surface of the hole 61a.

Each of the rear bush mounts 62 is a portion into which the rear bush 200 is press-fitted and fixed, and specifically is a cylindrically shaped hole having a central axis extending along the rocking central axis of the lower arm 6 in the vehicular fore-and-aft direction. The rear bush 200 is a rubber bush for vibration isolation in a similar configuration to that of the front bush 100, and includes an inner cylinder and a rubber which has holes. The lower arm 6 is connected to a corresponding, support plate 7 by a bolt which is inserted into the inner cylinder of the rear bush 200 which is press-fitted into the rear bush mount 62.

The support plate 7 is a tabular member for supporting a lower portion of the lower arm 6 and is connected to a corresponding rear bush 200 by a bolt and secured to a portion near the rear end of the side member 2 by a bolt or the like, the rear bush 200 being press-fitted into the rear bush mount 62 of the lower arm 6 on each side.

Next, a front bush component force detection device 160 for detecting a component force will be described with reference to FIGS. 4 to 9, the component force acting on the front bush 100.

The front bush component force detection device 160 detects six component forces acting on the front bush 100 which connects the lower arm 6 and the cross member 5. The front bush component force detection device 160 includes a sensing unit 150, a plurality of strain gauges provided in the sensing unit 150, and a bridge circuit including the strain gauges, and further includes Fx detection system, Fy detection system, Fz detection system, Mx detection system, My detection system, and Mz detection system.

Figure 7:
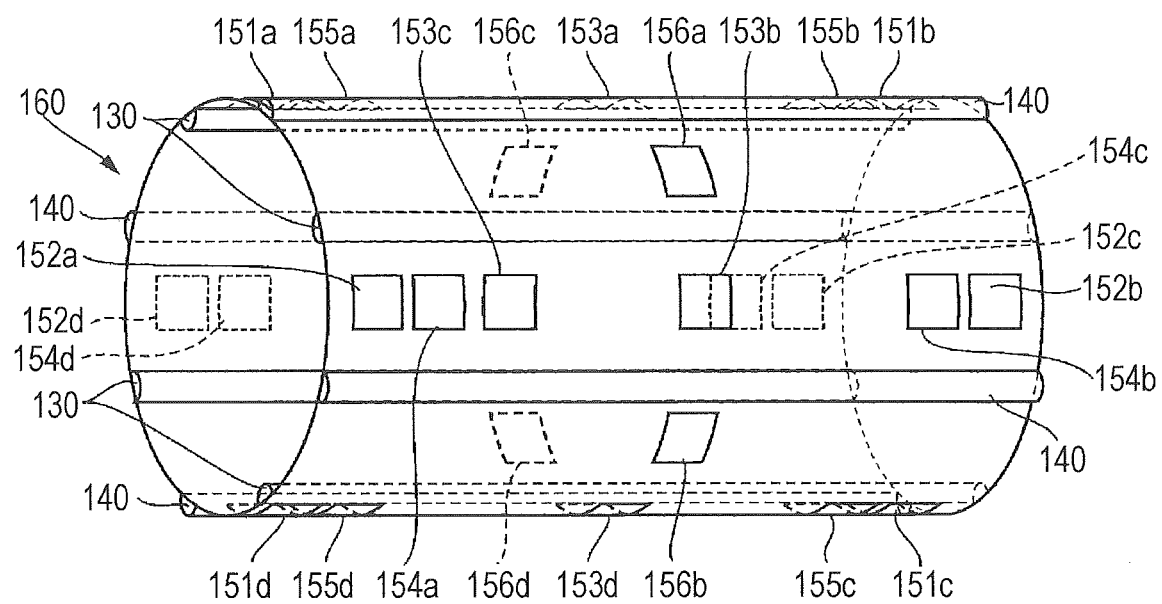
FIG. 7 is a schematic perspective view of a sensing unit of the implementation.

As illustrated in FIG. 7, the strain gauges are attached in rows along the axial direction of the sensing unit 150 between the inner-side projections 130 on the inner circumferential surface and the outer-side projections 140 on the outer circumferential surface of the sensing unit 150. Therefore, as illustrated in FIGS. 4 to 6, the strain gauges attached on the outer circumferential surface of the sensing unit 150 are not in contact with the inner circumferential surface of the hole 61a because the outer circumferential surface of the sensing unit 150 and the inner circumferential surface of the hole 61a are spaced apart by the outer-side projections 140. It should be noted that the strain gauges are formed in multiple rows, and in the present implementation, the strain gauges are attached on the sensing unit 150 in eight rows.

Fx detection system detects a force Fx acting on the sensing unit 150 in a radial direction (hereinafter x-axis direction). Fy detection system detects a force Fy acting on the sensing unit 150 in a radial direction (hereinafter y-axis direction) perpendicular to the x-axis direction. Fz detection system detects a force Fz acting on the sensing unit 150 in an axial direction (hereinafter z-axis direction). Mx detection system detects a moment Mx acting on the sensing unit 150 around the x-axis.

My detection system detects a moment My acting on the sensing unit 150 around the y-axis. Mz detection system detects a moment Mz acting on the sensing unit 150 around the z-axis.

Each of Fx detection system, Fy detection system, Fz detection system, Mx detection system, My detection system, and Mz detection system has a bridge circuit including four strain gauges.

Fx detection system has strain gauges 151*a*, 151*b*, 151*c*, and 151*d*. The strain gauges 151*a* to 151*d* are strain gauges for a single axis, and are attached on the outer circumferential surface of the sensing unit 150 so that the direction of detection is parallel to the central axis direction of the sensing unit 150.

Figure 8A:
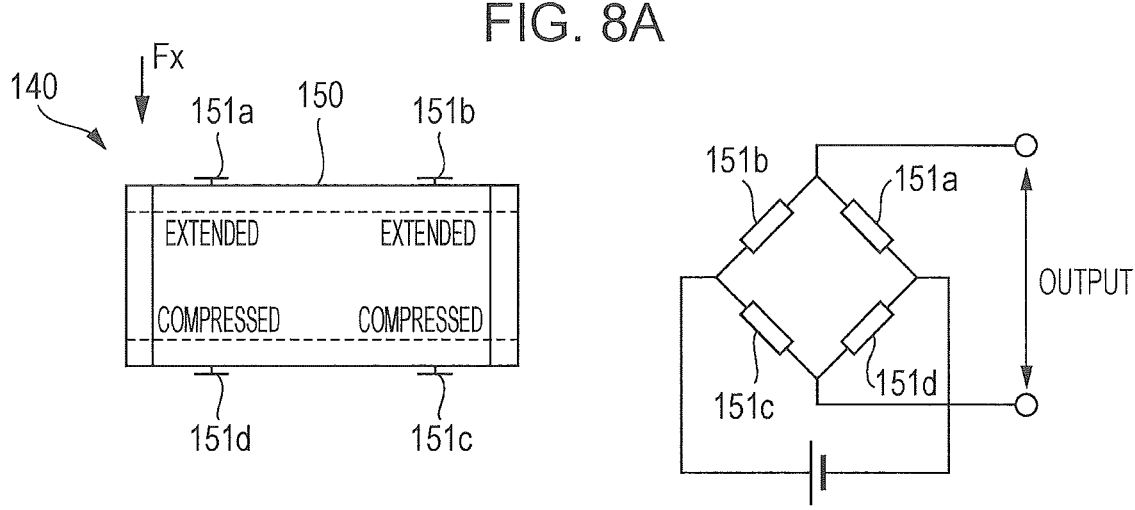
FIGS. 8A to 8C are diagrams each illustrating a configuration of a bridge circuit of a force detection system in a six component force detection device.

As illustrated in FIG. 8A, in the bridge circuit of Fx detection system, the strain gauges 151*a* to 151*d* are sequentially connected in a loop, and the positive electrode and negative electrode of a power supply are respectively connected to a point between the strain gauges 151*b* and 151*c* and a point between the strain gauges 151*a* and 151*d*, thereby generating a potential difference across a point between the strain gauges 151*a* and 151*b* and a point between strain gauges 151*c* and 151*d*.

As illustrated in FIG. 7, Fy detection system has strain gauges 152*a*, 152*b*, 152*c*, and 152*d*. The strain gauges 152*a* to 152*d* are strain gauges for a single axis, and are attached on the outer circumferential surface of the sensing unit 150 so that the direction of detection is parallel to the central axis direction of the sensing unit 150 and the positions of the strain gauges 152*a* to 152*d* are 90 degrees shifted in phase around the central axis of the sensing unit 150 with respect to the attachment positions of the strain gauges 151*a* to 151*d*.

Figure 8B:
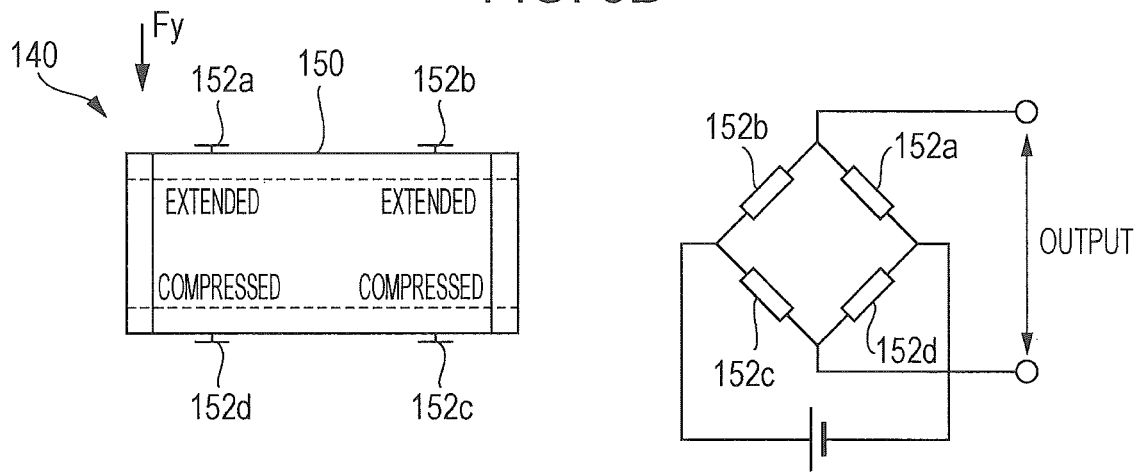

As illustrated in FIG. 8B, in the bridge circuit of Fy detection system, the strain gauges 152*a* to 152*d* are sequentially connected in a loop, and the positive electrode and negative electrode of a power supply are respectively connected to a point between the strain gauges 152*b*, 152*c* and a point between the strain gauges 152*a*, 152*d*, thereby generating a potential difference across a point between the strain gauges 152*a*, 152*b* and a point between strain gauges 152*c*, 152*d*.

As illustrated in FIG. 7, Fz detection system has strain gauges 153*a*, 153*b*, 153*c*, and 153*d*. The strain gauges 153*a* to 153*d* are strain gauges for a single axis, and are attached on the outer circumferential surface of the sensing unit 150 so that the direction of detection is parallel to the central axis direction of the sensing unit 150. The strain gauge 153*a* is disposed at the midpoint between the strain gauges 151*a* and 151*b*, and the strain gauges 153*b* to 153*d* are disposed at the positions 90 degrees, 180 degrees, and 270 degrees shifted in phase, respectively around the central axis of the sensing unit 150 with respect to the strain gauge 153*a*.

Figure 8C:
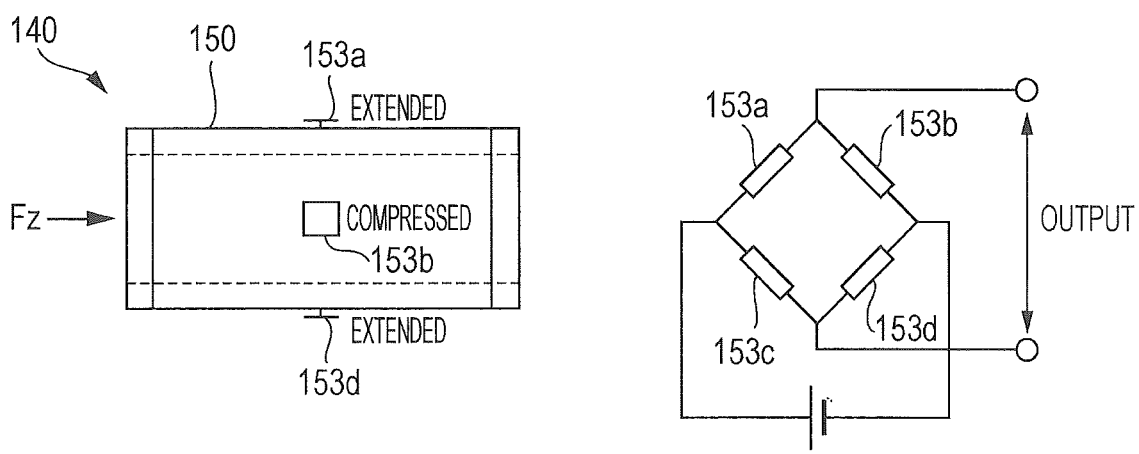

As illustrated in FIG. 8C, in the bridge circuit of Fz detection system, the strain gauges 153*a* to 153*d* are sequentially connected in a loop, and the positive electrode and negative electrode of a power supply are respectively connected to a point between the strain gauges 153*a*, 153*c* and a point between the strain gauges 153*b*, 153*d*, thereby generating a potential difference across a point between the strain gauges 153*a*, 153*b* and a point between strain gauges 153*c*, 153*d*.

As illustrated in FIG. 7, Mx detection system has strain gauges 154*a*, 154*b*, 154*c*, and 154*d*. The strain gauges 154*a* to 154*d* are strain gauges for a single axis, and are attached on the outer circumferential surface of the sensing unit 150 so that the direction of detection is parallel to the central axis direction of the sensing unit 150. The strain gauges 154*a* to 154*d* are disposed adjacent to the strain gauges 152*a* to 152*d*, respectively in the central axis direction of the sensing unit 150.

Figure 9A:
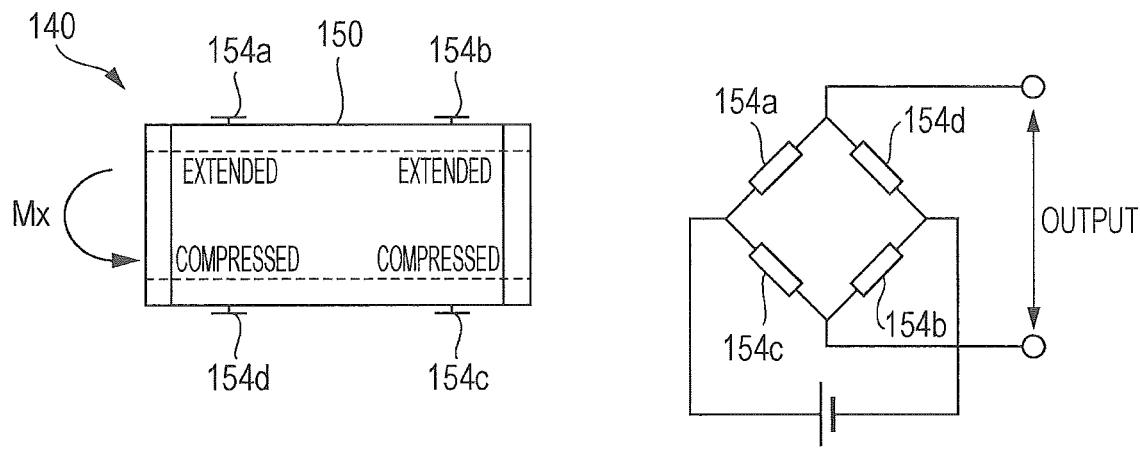
FIGS. 9A to 9C are diagrams each illustrating a configuration of a bridge circuit of a moment detection system in the six component force detection device.

As illustrated in FIG. 9A, in the bridge circuit of Mx detection system, the strain gauges 154*a* to 154*d* are sequentially connected in a loop, and the positive electrode and negative electrode of a power supply are respectively connected to a point between the strain gauges 154*a*, 154*c* and a point between the strain gauges 154*b*, 154*d*, thereby generating a potential difference across a point between the strain gauges 154*a*, 154*b* and a point between strain gauges 154*c*, 154*d*.

As illustrated in FIG. 7, My detection system has strain gauges 155*a*, 155*b*, 155*c*, and 155*d*. The strain gauges 155*a* to 155*d* are strain gauges for a single axis, and are attached on the outer circumferential surface of the sensing unit 150 so that the direction of detection is parallel to the central axis direction of the sensing unit 150. The strain gauges 155*a* to 155*d* are disposed adjacent to the strain gauges 151*a* to 151*d*, respectively in the central axis direction of the sensing unit 150.

Figure 9B:
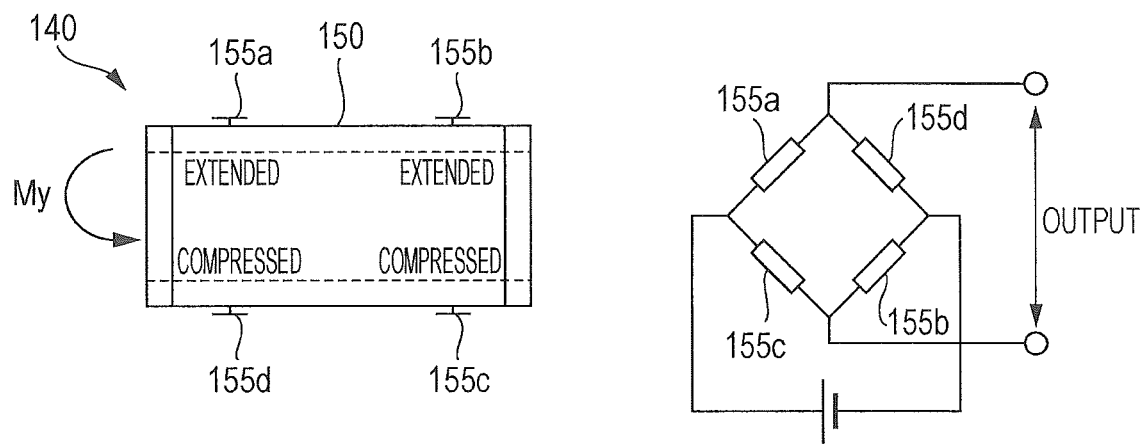

As illustrated in FIG. 9B, in the bridge circuit of My detection system, the strain gauges 155*a* to 155*d* are sequentially connected in a loop, and the positive electrode and negative electrode of a power supply are respectively connected to a point between the strain gauges 155*a*, 155*c* and a point between the strain gauges 155*b* and 155*d*, thereby generating a potential difference across a point between the strain gauges 155*a* and 155*b* and a point between strain gauges 155*c* and 155*d*.

As illustrated in FIG. 7, Mz detection system has strain gauges 156*a*, 156*b*, 156*c*, and 156*d*. The strain gauges 156*a* to 156*d* are shear strain gauges, and are attached on the outer circumferential surface of the sensing unit 150 so that the direction of detection is parallel to the circumferential direction of the sensing unit 150. The strain gauges 156*a* and 156*b* are disposed between the strain gauges 153*a*, 153*b* and between the strain gauges 153*b* and 153*d*, respectively. The strain gauges 156*c* and 156*d* are disposed symmetrically to the strain gauges 156*a* and 156*b* with respect to the central axis of the sensing unit 150.

Figure 9C:
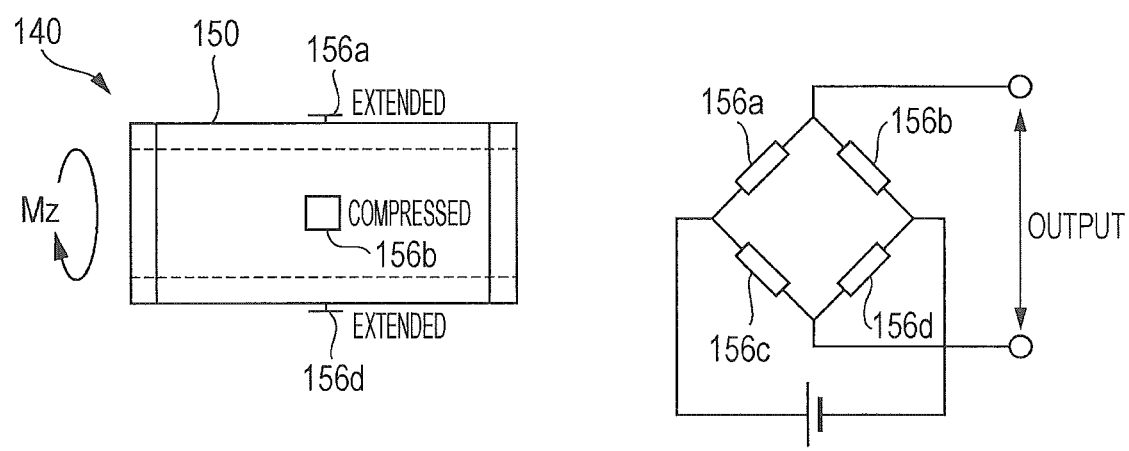

As illustrated in FIG. 9C, in the bridge circuit of Mz detection system, the strain gauges 156*a* to 156*d* are sequentially connected in a loop, and the positive electrode and negative electrode of a power supply are respectively connected to a point between the strain gauges 156*a* and 156*c* and a point between the strain gauges 156*b* and 156*d*, thereby generating a potential difference across a point between the strain gauges 156*a* and 156*b* and a point between strain gauges 156*c* and 156*d*.

With such a configuration, the front bush component force detection device 160 detects the distribution of the component force acting on the front bush 100. For example, point P illustrated in FIG. 4 is the base end central portion of the front bush mount 61, and point Q is the very end of the front bush mount 61. In the present implementation, when the strain of point P portion is detected to be 1.1 mv/v, the strain of point Q portion is detected to be 1.36 mv/v, it can be observed that force Fx is displaced toward point P. In this manner, a force acting on the front bush 100 is detected for given positions, and thereby the shape and arrangement of the front bush mount 61, and displacement of force due to the size of the holes may be accurately observed.

The rear bush 200 is also provided with a rear bush detection device for detecting component forces acting on the rear bush 200. Similarly to the front bush component force detection device 160, the rear bush detection device includes an inner ring, an outer ring, and a sensing unit. The rear bush detection device is capable of detecting component forces acting in radial directions (x-axis direction and y-axis direction), a component force acting in the axial direction (z-axis direction), a component force acting around the x-axis, a component force acting around the y-axis, and a component force acting around the z-axis, all the component forces acting on the rear bush 200.

As described above, the inner-side projections 130 are provided on the inner circumferential surface of the sensing unit 150, and the outer-side projections 140 and the strain gauges are provided on the outer circumferential surface of the sensing unit 150 which is provided between the front bush 100 and the hole 61a, and thereby the distribution of the component forces acting on the front bush 100 may be directly and accurately detected. That is, the outer circumferential surface of the front bush 100, which is press-fitted into the sensing unit 150, has an increased contact surface with the inner circumferential surface of the sensing unit 150, the increased being caused by the inner-side projections 130, and thus deformation of the sensing unit 150 due to the pressure of the front bush 100 may be reduced to a minimum and the component forces may be accurately detected. In addition, a certain space is maintained between the outer circumferential surface of the sensing unit 150 and the inner circumferential surface of the hole 61a by the outer-side projections 140, which allows deformation of the sensing unit 150 and prevents a malfunction due to contact of the strain gauges with the inner circumferential surface of the hole 61a. Thus, component forces may be accurately detected normally.

The plurality of inner-side projections 130 and outer-side projections 140 provided on the inner and outer circumferential surfaces of the sensing unit 150 are disposed at regular intervals, and thus non-uniform deformation of the sensing unit 150 may be prevented.

In the suspension device 10 for a vehicle in the present implementation, the lower arm 6 and the cross member 5 are connected via the front bush 100, the lower arm 6 and the support plate 7 are connected via the rear bush 200, and the front bush 100 and the rear bush 200 are provided with respective component force detection devices for detecting a component force acting of the bush. However, without being limited to this, a bush may be used for a bearing member of a connecting portion of other structural members, and the bush may be provided with a component force detection device which is similar to the front bush component force detection device 140 in the front bush 100.

In the present implementation, a rubber bush is used for the front bush 100 and the rear bush 200. However, without being limited to this, a bush using, for example, urethane may be adopted.

In the present implementation, a plurality of strain gauges is attached on the outer circumferential surface of the sensing unit 150. However, without being limited to this, the plurality of strain gauges may be attached on the inner circumferential surface of the sensing unit 150.

In the present implementation, the front bush component force detection device 160 is used to detect a component force acting on the front bush 100 mounted on the vehicle. However, without being limited to this, for example, a sensing unit may be provided independently, into which a bush is press-fitted, and a component force acting on the bush may be detected.

In the present implementation, the inner-side projections 130 and the outer-side projections 140 are provided at regular intervals in the circumferential direction of the sensing unit 150. However, without being limited to this, the inner-side and outer-side projections 130, 140 may be provided at irregular intervals. In this case, it is necessary to correct a measurement value in each bridge circuit.

In the present implementation, the outer-side projections 140 are provided on the outer circumferential surface of the sensing unit 150. However, without being limited to this, the outer-side projections 140 may be provided on the inner circumferential surface of the hole 61a.

In the present implementation, the number of provided inner-side projections 130 and outer-side projections 140 are four each. However, without being limited to this, the number may be greater than four or less than four, and the number of provided inner-side projections 130 may be greater than or less than the number of provided outer-side projections 140. The strain gauges are attached on the sensing unit 150 in eight rows, however, the strain gauges may be attached in four rows or 16 rows.

The invention claimed is:

1. A bush component force detection device that detects a component force acting on a bush which is press-fitted into a hole provided in a frame of a vehicle, the bush component force detection device comprising:
    a cylinder which is inserted into the hole with predetermined space therefrom and has strain gauges;
    elastically deformable outer-side projections that extend in an axial direction of the cylinder and project radially outward from an outer surface of the cylinder; and
    elastically deformable inner-side projections that extend in an axial direction of the cylinder and project radially inward from an inner surface of the cylinder,
    wherein the strain gauges are attached in rows along the axial direction of the cylinder between the inner-side projections and the outer-side projections.

2. The bush component force detection device according to claim 1, wherein
    each of the outer-side projections is disposed at an interval from adjacent outer-side projections in a circumferential direction of the cylinder; and
    each of the inner-side projections is disposed at an interval from adjacent inner-side projections in the circumferential direction of the cylinder.

3. The bush component force detection device according to claim 2, wherein the outer-side projections and the inner-side projections are alternately disposed in the circumferential direction of the cylinder.

4. The bush component force detection device according to claim 1, wherein the outer-side projections and the inner-side projections are alternately disposed in the circumferential direction of the cylinder.

* * * * *